US009288874B2

United States Patent
Khalsa et al.

(10) Patent No.: US 9,288,874 B2
(45) Date of Patent: Mar. 15, 2016

(54) TURNING OFF MULTIPLE FLUORESCENT LAMPS SIMULTANEOUSLY USING RF-ENABLED LAMP STARTER UNITS

(75) Inventors: Kamlapati Khalsa, San Jose, CA (US); Yefim Gluzman, San Francisco, CA (US); Quyen Tran, Morgan Hill, CA (US)

(73) Assignee: IXYS Intl Limited (KY)

( * ) Notice: Subject to any disclaimer, the term of this patent is extended or adjusted under 35 U.S.C. 154(b) by 1585 days.

(21) Appl. No.: 12/587,130

(22) Filed: Oct. 3, 2009

(65) Prior Publication Data

US 2011/0080106 A1    Apr. 7, 2011

(51) Int. Cl.
  *H05B 37/02*    (2006.01)

(52) U.S. Cl.
  CPC ........ *H05B 37/0218* (2013.01); *H05B 37/0227* (2013.01); *H05B 37/0272* (2013.01); *Y02B 20/46* (2013.01)

(58) Field of Classification Search
  CPC ........... H05B 37/0218; H05B 37/0227; H05B 37/0272; H05B 37/034; H05B 37/038; Y02B 20/46
  USPC .......... 315/250, 313, 61, 312, 318, 320, 324, 315/315, 308, 307, 297, 291, DIG. 5, 315/DIG. 7; 455/66.1
  See application file for complete search history.

(56) References Cited

U.S. PATENT DOCUMENTS

| | | | |
|---|---|---|---|
| 4,145,638 A | * | 3/1979 | Kaneda ........................ 315/323 |
| 4,513,225 A | * | 4/1985 | Lemmers et al. ............. 315/189 |
| 6,859,644 B2 | * | 2/2005 | Wang ......................... 455/159.2 |
| 2004/0046511 A1 | * | 3/2004 | Porter ............................ 315/291 |
| 2004/0217718 A1 | * | 11/2004 | Kumar et al. ................. 315/291 |

(Continued)

FOREIGN PATENT DOCUMENTS

DE    3542412 A1    11/1985
GB    2155258 A    1/1984

OTHER PUBLICATIONS

Extended European Search Report (Office action) by EPO in related European application EP10183046.1 dated Mar. 4, 2011 (10 pages).

(Continued)

*Primary Examiner* — Tuyet Vo
*Assistant Examiner* — Henry Luong
(74) *Attorney, Agent, or Firm* — Imperium Patent Works; Joseph S. Spano; Darien K. Wallace

(57) ABSTRACT

A multi-lamp fluorescent light fixture includes a plurality of replaceable fluorescent lamp starter units. Each starter unit has a built-in microcontroller, an RF (Radio-Frequency) receiver, and communicates wirelessly with a master unit. Each starter unit can be wirelessly controlled to turn off coupled fluorescent lamps. Each starter unit receives a turn off command, monitors the AC voltage supplied to coupled lamps, and initiates turn off when the AC voltage reaches a threshold voltage stored in a memory of the microcontroller. In one novel aspect, each threshold voltage is selected such that turn off of lamps coupled to each starter is initiated within one millisecond. Systems of existing light fixtures are retrofitted with such wireless starter units, and thereby made controllable by a master unit so that the master unit can turn off the lights if room occupancy is not detected or if sufficient ambient light is available.

20 Claims, 7 Drawing Sheets

RF-ENABLED STARTER UNITS TURN-OFF FLUORESCENT LAMPS OF MULTI-LAMP LIGHT FIXTURE

(56) References Cited

U.S. PATENT DOCUMENTS

| | | | |
|---|---|---|---|
| 2007/0189001 A1 | 8/2007 | Nielson et al. | 362/16 |
| 2008/0111498 A1* | 5/2008 | Budike | H05B 37/0272 315/291 |

OTHER PUBLICATIONS

Summons to attend oral proceeding (Office action) by EPO in related European application EP10183046.1 dated Nov. 11, 2012 (7 pages).

* cited by examiner

RF-ENABLED STARTER UNITS TURN-OFF FLUORESCENT
LAMPS OF MULTI-LAMP LIGHT FIXTURE

TURN-OFF OF MULTIPLE FLUORESCENT LAMPS

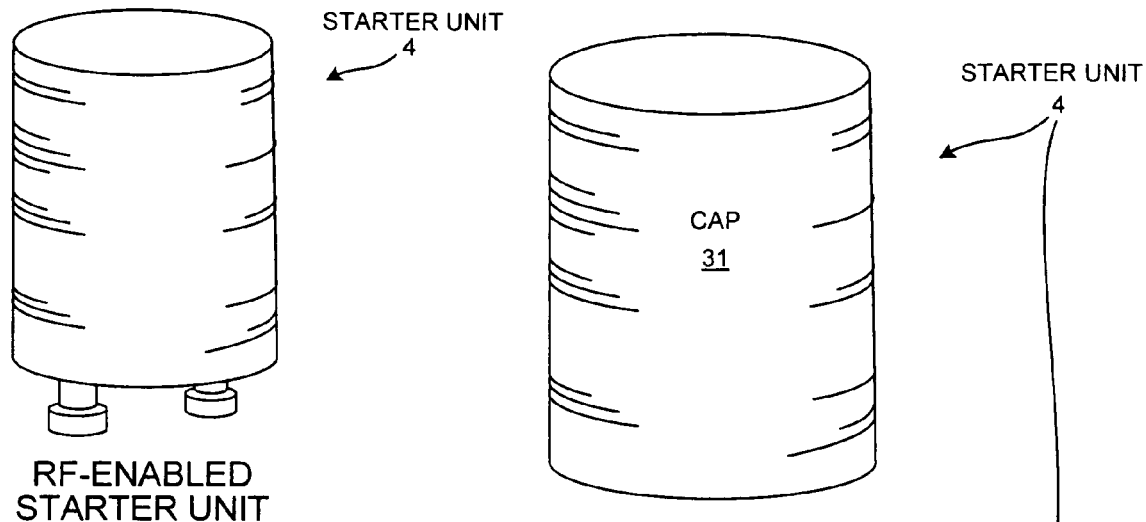
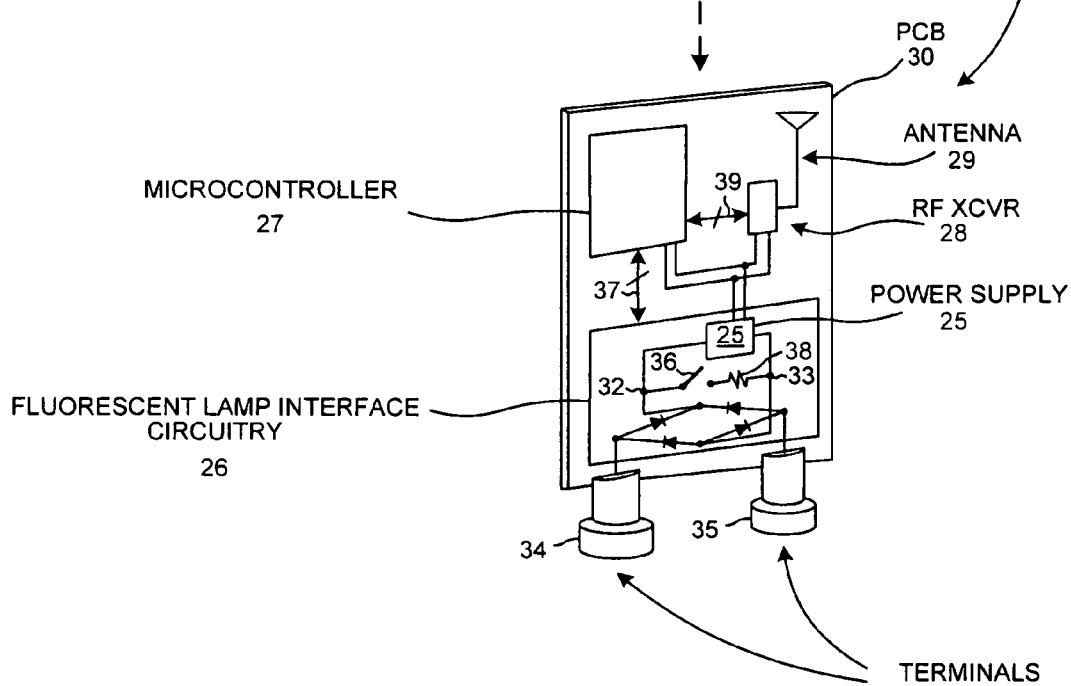

LAMP TURNED ON

STARTER RECEIVES TURN OFF
COMMAND AND MONITORS VRECT

INITIATE TURN OFF WHEN VRECT REACHES VTHRS1

OPEN SWITCH

OPERATE SWITCH AS A VOLTAGE CLAMP

TURN OFF COMPLETE

TURNING OFF MULTIPLE FLUORESCENT LAMPS SIMULTANEOUSLY USING RF-ENABLED LAMP STARTER UNITS

TECHNICAL FIELD

The described embodiments relate to starter units for fluorescent lamps.

BACKGROUND INFORMATION

A multi-lamp fluorescent light fixture involves a number of tubular fluorescent bulbs. Each fluorescent bulb is also referred to here as a fluorescent lamp. Each tube is a glass tube that contains an ionizable gas and a small portion of mercury. There are filaments at each end of the tube. By application of proper electrical voltages, the filaments can be made to heat up and to ionize the ionizable gas in the tube. After sufficient heating, if a voltage of adequate magnitude is subsequently provided between the filaments, an electrical arc can be initiated through the ionized gas in the tube between the filaments. The arc involves a flow of current from one filament, through the ionized gas, to the other filament. Energetic electrons in this current flow collide with the mercury atoms, thereby exciting the mercury atoms and causing them to emit ultraviolet radiation. The emitted ultraviolet radiation is absorbed by and excites a phosphor coating on the inside of the walls of the tube. The phosphor coating fluoresces and emits radiation in the visible spectrum (i.e., visible light). The visible light passes outward through the glass and is usable for illuminating purposes.

Some such multi-lamp fluorescent light fixtures involve a plurality of starter circuits, each commonly referred to as a "starter." In a first step, a switch in the starter closes and forms an electrical connection between the filament at one end of a tube and the filament at the other end of the tube such that an AC current can flow from an AC power source, through a ballast, through one filament, through the closed switch of the starter, and through the second filament, and back to the AC power source. This AC current flow causes the filaments to heat. The heating of the filaments causes gas surrounding the filaments to ionize. Once the gas is ionized in this way, then the switch in the starter is opened. The opening of the switch cuts current flow through the ballast, thereby causing a large voltage spike to develop. Due to the circuit topology, this large voltage is present between the two filaments. The voltage is large enough to strike an arc through the gas. Once the arc is established, the resistance between the two filaments through the gas decreases. This allows the current to continue to flow through the gas without a large voltage being present between the filaments. The switch is left open, the current continues to flow, filaments continue to be heated, the arc is maintained, and the current flow is regulated by the ballast. The fluorescent lamp is then on and emits visible light to illuminate an area.

In multi-lamp fluorescent light fixtures, the starters may fail. Each starter is therefore sometimes made to be a replaceable unit. Great numbers of fluorescent light fixtures with replaceable starter units are installed throughout the world. Large numbers of such fluorescent light fixtures are installed in public buildings, office buildings, and other large buildings. Quite often the fluorescent lights are left on and consume electrical energy even though the area served does not need to be illuminated. A way of preventing this waste of electrical energy is desired.

Infrared motion detecting wall switches are often employed to prevent the waste of energy due to lights being left on when lighting is not needed. If an infrared motion detector in the wall switch does not detect motion of an infrared emitter (for example, a human body) in the vicinity of the wall switch, then circuitry in the wall switch determines that the room is not occupied by a person. Presumably if a person were in the room, the person would be moving to some extent and would be detected as a moving infrared emitter. If the wall switch determines that the room is unoccupied because it does not detect any such moving infrared emitter, then the wall switch turns off the fluorescent lights on the circuit controlled by the wall switch. The wall switch turns off the fluorescent lights by cutting AC power flowing to the fluorescent lamp light fixtures through power lines hardwired into the building. If, however, the wall switch detects a moving infrared emitter, then the wall switch turns on the lights by energizing the hardwired power lines so that AC power is supplied to the fluorescent light fixtures through the hardwired power lines.

The wall switch motion detection system involving hardwired power lines embedded in the walls and ceilings of buildings is quite popular, but a wireless system has been proposed whereby each of the replaceable starter units is to be provided with an RF receiver. Each starter unit is then to turn off or turn on each fluorescent lamp of a multi-lamp fluorescent light fixture simultaneously in response to RF commands received from a master control unit.

SUMMARY

A multi-lamp fluorescent light fixture includes a plurality of replaceable fluorescent lamp starter units. Each starter unit has a built-in microcontroller, an RF (Radio-Frequency) receiver, and communicates wirelessly with a master unit. Each starter unit can be wirelessly controlled to turn off coupled fluorescent lamps. Each starter unit receives a turn off command, monitors the AC voltage supplied to coupled lamps, and initiates turn off when the AC voltage reaches a threshold voltage stored in a memory of the microcontroller.

In one novel aspect, the starter units of a multi-lamp light fixture can be wirelessly controlled to turn off coupled fluorescent lamps at substantially the same time. In one example, each threshold voltage associated with each starter unit is individually selected such that turn off of lamps coupled to each starter is initiated within one millisecond. In another example, a common threshold voltage is associated with each starter unit such that turn off of coupled lamps is initiated within one millisecond. This minimizes the probability that electro-magnetic interaction between lamps in close proximity will unintentionally cause illuminated lamps to restart lamps that have recently been turned off.

Systems of existing light fixtures are retrofitted with such wireless starter units without requiring a person to touch the AC power mains, and thereby are made controllable by a master unit so that the master unit can turn off the lights if room occupancy is not detected or if sufficient ambient light is available. The master unit can be installed in a location to detect whether an area illuminated by the fluorescent light fixture is occupied by a person or is sufficiently illuminated by ambient light. The master unit may, for example, be a battery-powered unit that is fixed to the ceiling of a room.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is a perspective view of starter unit 4 of FIG. 1.

FIG. 4 is an exploded perspective view of the RF-enabled starter unit 4 of FIG. 3.

DETAILED DESCRIPTION

Reference will now be made in detail to background examples and some embodiments of the invention, examples of which are illustrated in the accompanying drawings.

Figure 1:
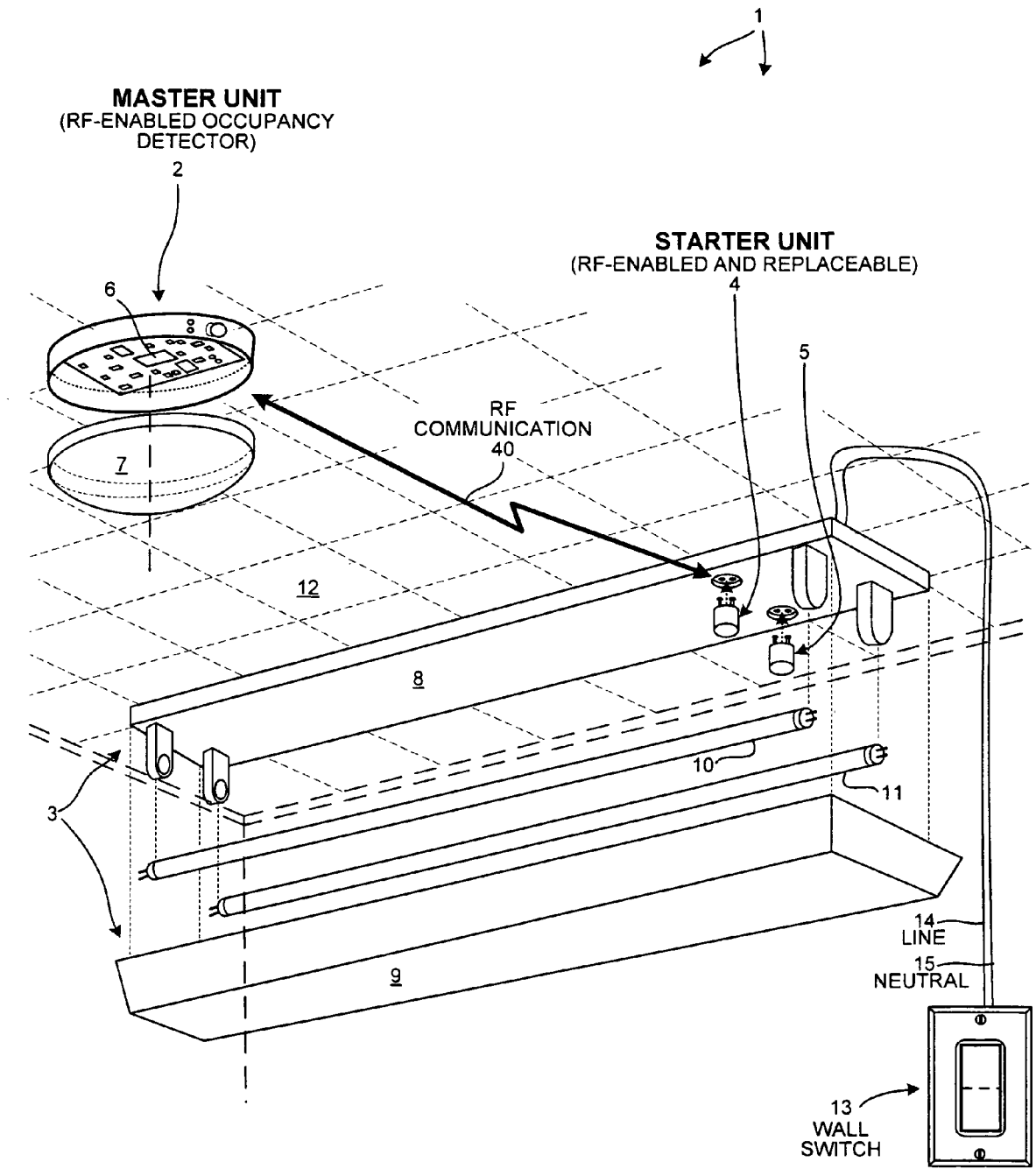
FIG. 1 is a simplified perspective diagram of a system 1 involving a master unit 2 and a fluorescent light fixture 3 involving replaceable RF-enabled starter units 4 and 5.

FIG. 1 is a diagram of a system 1. System 1 involves a master unit 2 and a plurality of multi-lamp fluorescent light fixtures having fluorescent lamp starter units. For illustrative purposes, one multi-lamp fluorescent light fixture 3 is pictured in FIG. 1. Other multi-lamp fluorescent light fixtures of system 1 are not pictured. Multi-lamp fluorescent light fixture 3 includes two fluorescent lamps 10 and 11 and starter units 4 and 5 associated with each lamp, respectively. In this example, master unit 2 is an infrared occupancy detector involving a Passive InfraRed (PIR) sensor 6 and a multi-section fresnel lens 7. Using techniques well known in the art, master unit 2 detects motion of infrared emitters in the field of view of the fresnel lens and detects the lack of motion of such infrared emitter. If the master unit detects motion, then the master unit is to turn on or to keep on the fluorescent lamps of the fluorescent light fixtures of system 1. If, on the other hand, the master unit does not detect motion, then the master unit is to turn off the fluorescent lamps of system 1 to conserve electrical energy. In another example, master unit 2 includes an ambient light detector useable to indicate available ambient light. Based on the available ambient light, the master unit may turn off fluorescent lamps of the multi-lamp fixture 3 of system 1 to conserve electrical energy. In the illustration of FIG. 1, multi-lamp light fixture 3 includes a base portion 8, a translucent cover portion 9, fluorescent bulbs or lamps 10 and 11, and their associated starter units 4 and 5, respectively. Ballasting inductances (not shown) are part of the base portion 8. Both the multi-lamp light fixture 3 and the master unit 2 are fixed to the ceiling 12 of a room in a building as shown. A wall switch 13 is connected by electrical wires 14 and 15 to all the light fixtures of system 1 in standard fashion so that a person in the room can manipulate the wall switch to turn on, and to turn off, the fluorescent lights. The electrical wires 14 and 15 are embedded in the walls and ceiling of the building. In the illustrated example, wire 14 is the LINE wire, whereas wire 15 is the NEUTRAL wire.

Master unit 2 has a Radio-Frequency (RF) transceiver (transmitter and receiver) for engaging in RF communication, including RF communication with the starter units of system 1. As pictured, master unit 2 need not be connected to any hardwired electrical wiring in the building. The master unit 2 pictured is a self-contained, battery-powered unit that is fixed to the ceiling 12 of the room illuminated by system 1. Master unit 2 can be easily fixed to ceiling 12 by application of adhesive tape or by a screw or other common attachment mechanism. Each multi-lamp light fixture of system 1 includes a plurality of replaceable starter units. Starter units 4 and 5 pictured in FIG. 1 is one example.

Figure 2:
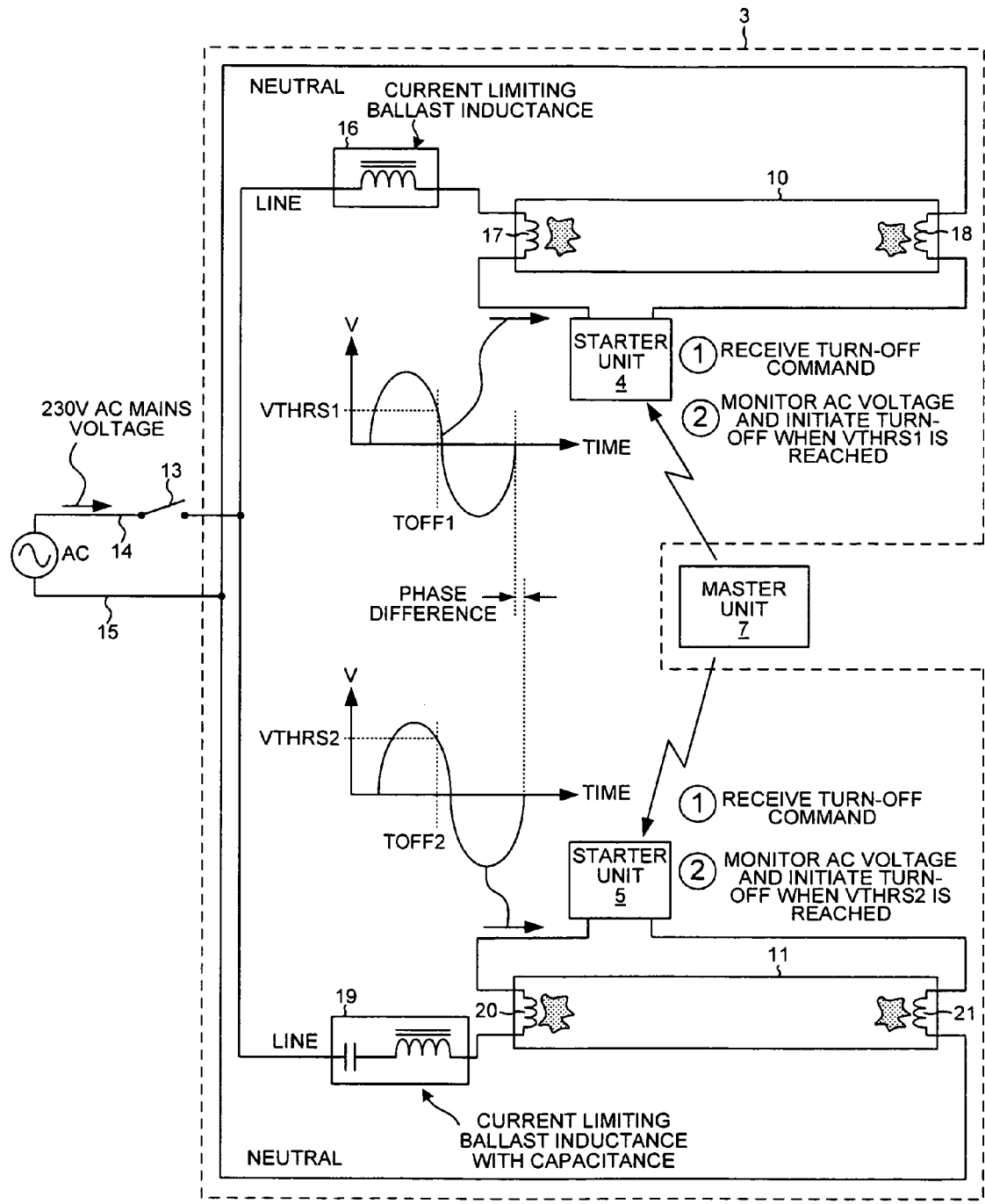
FIG. 2 is illustrative of one embodiment operable to simultaneously turn off fluorescent lamps of a multi-lamp fluorescent light fixture.

FIG. 2 is a more detailed circuit view of system 1. In one example, 230 Volts Alternating Current (AC) Mains voltage is the line voltage supplied to multi-lamp fluorescent light fixture 3. The line voltage is supplied over LINE conductor 14 through wall switch 13. A neutral voltage return path is provided by NEUTRAL conductor 15. Multi-lamp light fixture 3 can be electrically disconnected from the AC MAINS voltage supply by manipulation of wall switch 13. Within multi-lamp light fixture 3, the AC MAINS voltage is supplied to ballasts 16 and 19. Ballast 16 supplies current to fluorescent lamp 10 when lamp 10 is turned on. While turned on, current flows from ballast 16, through filament 17, over an electrical arc to filament 18, and back to the AC MAINS voltage supply via NEUTRAL conductor 15. Similarly, ballast 19 supplies current to fluorescent lamp 11 when lamp 11 is turned on. While turned on, current flows from ballast 19, through filament 20, over an electrical arc to filament 21, and back to the AC MAINS voltage supply via NEUTRAL conductor 15. When starter unit 4 receives a turn off command from master unit 2, starter unit 4 begins to monitor the AC voltage being supplied to fluorescent lamp 10. When the AC voltage reaches voltage threshold level VTHRS1, starter unit 4 initiates turn off of lamp 10 at a time TOFF1. When starter unit 5 receives a turn off command from master unit 2, starter unit 5 begins to monitor the AC voltage being supplied to fluorescent lamp 11. When the AC voltage reaches voltage threshold level VTHRS2, starter unit 5 initiates turn off of lamp 11 at a time TOFF2.

Ballast 16 has an inductive component that performs a current limiting function to stabilize current flow through lamp 10. Similarly, ballast 19 also has an inductive component to stabilize current flow through lamp 11. In addition, however, ballast 19 also includes a capacitive component for purposes of power factor correction as is well known in the art. The difference in reactance between ballasts 16 and 19 causes an overall phase shift between the AC voltage supplied to fluorescent lamp 10 and the AC voltage supplied to fluorescent lamp 11. Based on this phase shift, VTHRS1 and VTHRS2 are selected such that starter unit 4 initiates turn off of lamp 10 at substantially the same time as starter unit 5 initiates turn off of lamp 11. It is desirable to turn off lamp 10 and lamp 11 at substantially the same time to reduce the probability that one lamp will restart the other due to electromagnetic coupling effects. In one example, VTHRS1 and VTHRS2 are individually selected to have different values such that starter 4 initiates turn off of lamp 10 within one millisecond of when starter unit 5 initiates turn off of lamp 11. Thus the difference between TOFF1 and TOFF2 is less than one millisecond. In another example, VTHRS1 and VTHRS2 are selected to have the same value such that starter 4 initiates turn off of lamp 10 within one millisecond of when starter unit 5 initiates turn off of lamp 11. Thus the difference between TOFF1 and TOFF2 is less than one millisecond.

FIG. 3 is a perspective view of starter unit 4.

FIG. 4 is an exploded perspective view of starter unit 4. Starter unit 4 includes a first terminal 34, a second terminal 35, a power supply 25, fluorescent lamp interface circuitry 26, a microcontroller integrated circuit 27, an RF transceiver 28, and an antenna 29. This circuitry is disposed on a printed circuit board (PCB) 30 as illustrated. PCB 30 is disposed within a cylindrical cap 31. Terminals 34 and 35 extend downward through holes in a circular disk-shaped base portion (not shown) of PCB material. The circular edge of this disk-shaped base portion joins with the circular bottom edge of cap 31 and forms a circular bottom of starter unit 4.

Fluorescent lamp interface circuitry 26 includes a full wave rectifier that receives an AC voltage signal between terminals 34 and 35 and outputs full wave rectified signal between nodes 32 and 33. Power switch 36 is a switch that is used to turn on, and to turn off, fluorescent lamp 10. Power switch 36 is a power Field Effect Transistor (FET) that is controlled by microcontroller 27 via gate drive circuitry of circuitry 26. Microcontroller 27 drives the gate of switch 36 and controls and monitors the remainder of interface circuitry 26 via signals communicated across conductors 37. When switch 36 is open, microcontroller 27 monitors and traces the AC voltage waveform between nodes 32 and 33 using an Analog-to-Digital Converter (ADC) that is part of the microcontroller. When switch 36 is closed, microcontroller 27 monitors and traces the waveform of the current flowing through switch 36 by using its ADC to monitor a voltage dropped across a sense resistor 38. In one example, sense resistor 38 has a resistance of approximately 0.1 ohms. Microcontroller 27 uses an onboard comparator and timer to detect and time zero-crossings of the AC signal on terminals 34 and 35. Microcontroller 27 determines when and how to control switch 36 based on the detected AC voltage between nodes 32 and 33, the time of the zero-crossings of the AC signal on terminals 34 and 35, and the magnitude of current flow through switch 36. During power up microcontroller 27 reads a known location in FLASH memory for voltage threshold information, including VTHRS1 and VTHRS2. This voltage threshold information is used by microcontroller 27 to initiate turn off of an associated fluorescent lamp in response to a turn off command.

Power supply 25 receives the full wave rectified signal between nodes 32 and 33 and generates therefrom a direct current (DC) supply voltage VDD used to power microcontroller 27, RF transceiver 28, and interface circuitry 26. Power supply 25 includes a capacitance that is charged to the DC supply voltage VDD. This capacitance is large enough that it continues to power the microcontroller and RF transceiver of the starter unit for more than five seconds after 230 VAC power is removed from terminals 34 and 35.

Microcontroller 27 communicates with and controls RF transceiver 28 via a bidirectional serial SPI bus and serial bus conductors 39. In one embodiment, microcontroller 27 is a Z8F2480 8-bit microcontroller integrated circuit available from Zilog, Inc., 6800 Santa Teresa Blvd., San Jose, Calif. 95119. Microcontroller 27 includes an amount of non-volatile memory (FLASH memory) that can be written to and read from under software control during operation of starter unit 4. In one embodiment, RF transceiver 28 is a SX1211 transceiver integrated circuit available from Semtech Corporation, 200 Flynn Road, Camarillo, Calif. 93012. Transceiver 28 is coupled to antenna 29 via an impedance matching network (not shown) and a SAW filter (not shown). The SAW filter may, for example, be a B3716 SAW filter available from the Surface Acoustic Wave Components Division of EPCOS AG, P.O. Box 801709, 81617 Munich, Germany. Antenna 29 may, for example, be a fifty ohm 0868AT43A0020 antenna available from Johanson Technology, Inc., 4001 Calle Tecate, Camarillo, Calif. 93012. The RF transceiver operates in a license free frequency band in the 863-878 MHz range (for example, about 868 MHz), in accordance with a reference design available from Semtech Corporation. The RF antenna and transceiver of starter unit 4 can receive an RF communication 40 (see FIG. 1) from master unit 2. The data payload of the communication 40 is communicated across SPI bus conductors 39 to microcontroller 27 for processing.

FIGS. 5-10 illustrate how starter unit 4 can turn off fluorescent lamp 10. In an analogous manner, starter unit 5 can turn off fluorescent lamp 11. Together starter units 4 and 5 can turn off fluorescent lamps 10 and 11, respectively as illustrated in FIG. 2.

Figure 5:
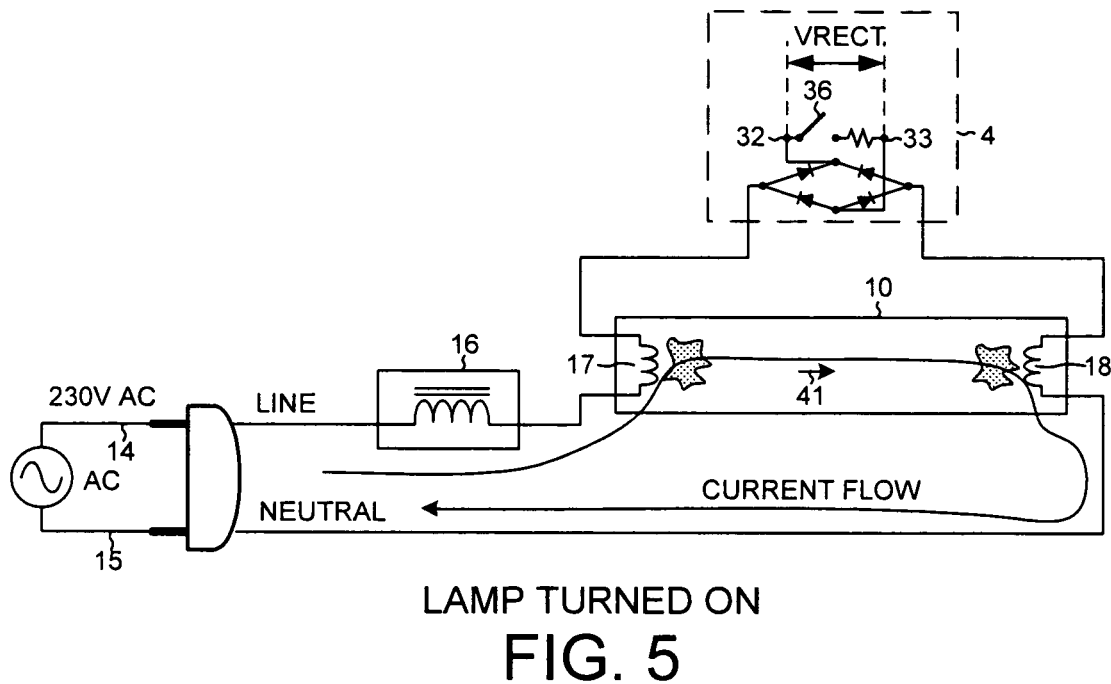
FIGS. 5-10 are circuit diagrams that illustrate how starter unit 4 can turn off fluorescent lamp 10 of the light fixture 3.

Initially, fluorescent lamp 10 is on and the circuit is in the turned on state illustrated in FIG. 5. An AC current flows in current path 41 through LINE conductor 14, through ballast 16, through filament 17, through an arc formed through lamp 10, through filament 18, and to AC NEUTRAL conductor 15. The continuous AC current flow continues to keep the filaments hot such that the arc is maintained, the current flow continues, and the lamp remains in a turned on state. During this turned on state, switch 36 remains open.

Figure 6:
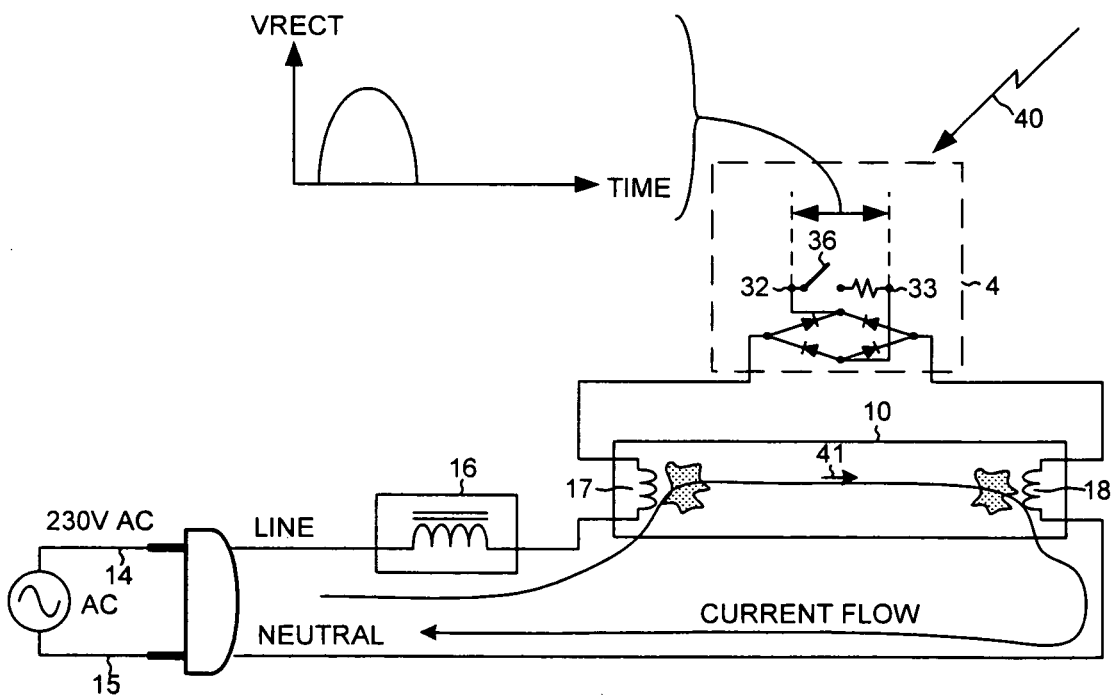

As illustrated in FIG. 6, starter 4 receives a wireless communication 40 that includes a turn off command. In one example, wireless communication 40 is transmitted by master unit 2 (see FIG. 1). In response to receiving wireless communication 40, starter 4 begins to monitor the full wave rectified voltage signal, VRECT, present between nodes 32 and 33. Microcontroller 27 monitors and traces the AC voltage waveform between nodes 32 and 33 using an Analog-to-Digital Converter (ADC) that is part of the microcontroller.

Figure 7:
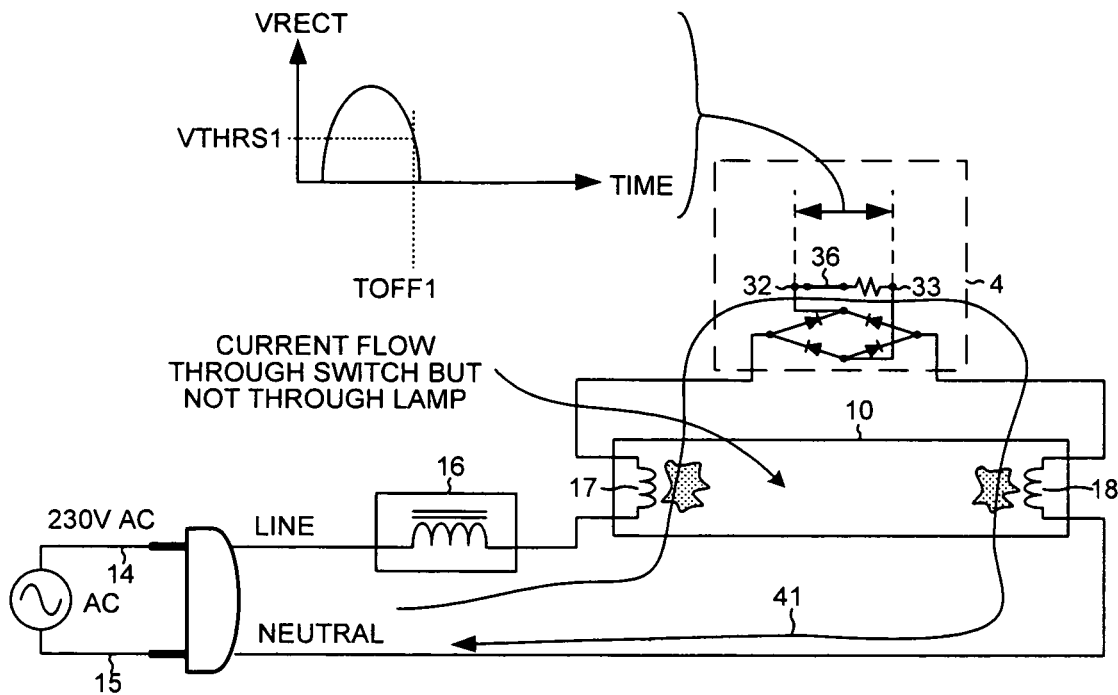
Figure 8:
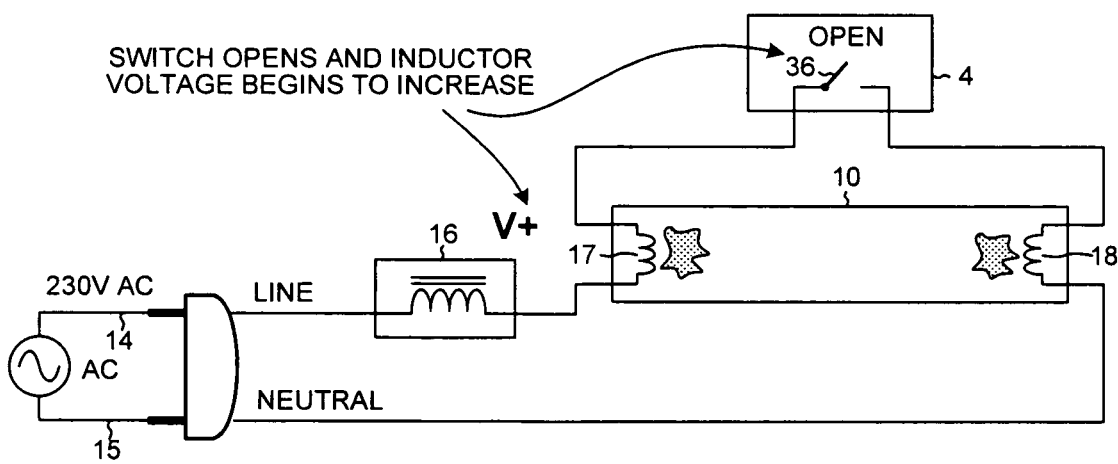
Figure 9:
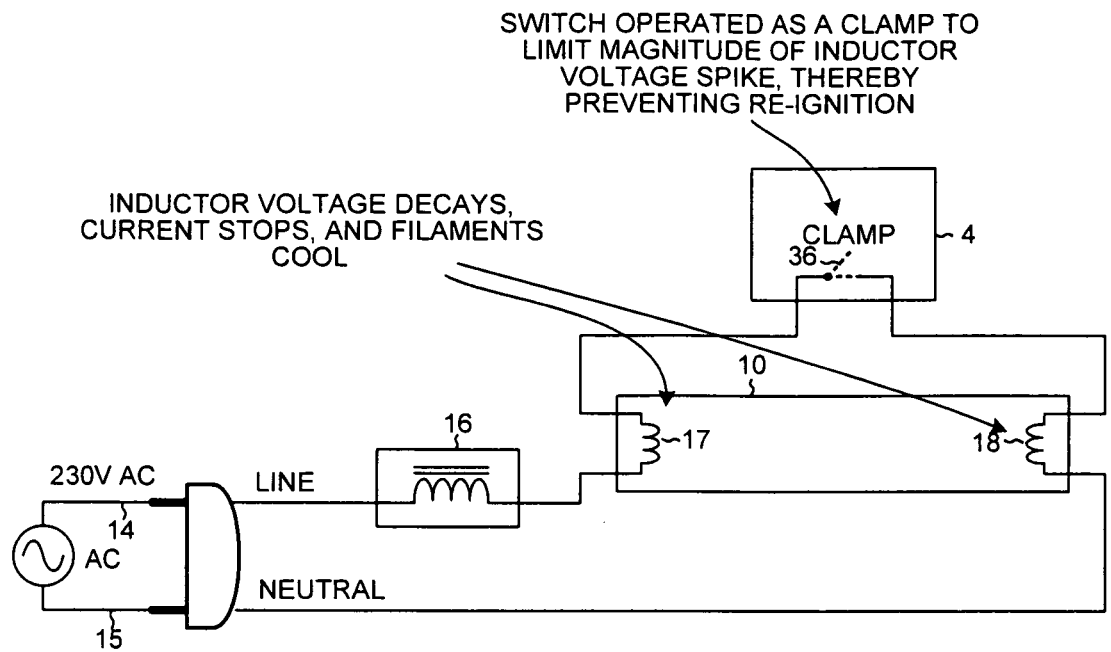
Figure 10:
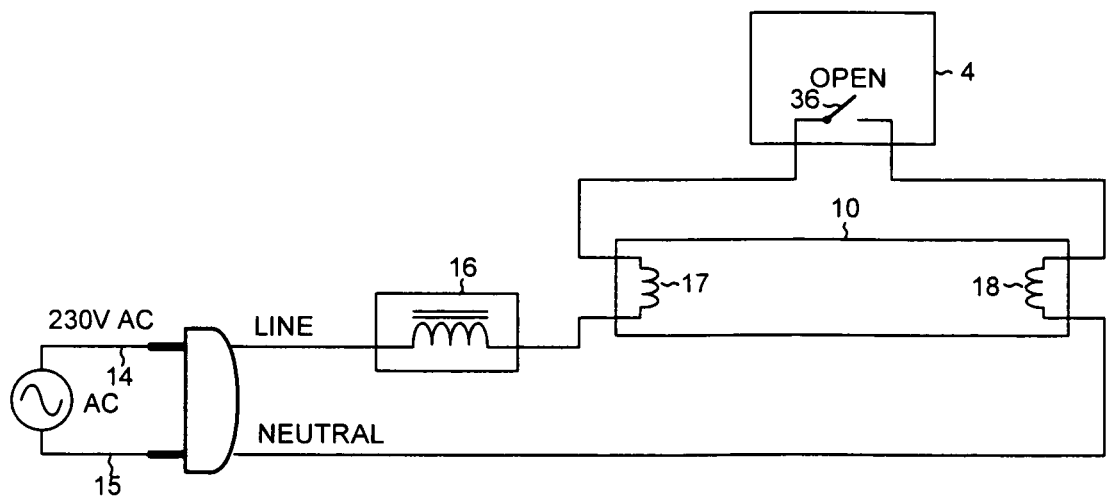

As illustrated in FIG. 7, starter 4 initiates turn off of fluorescent lamp 10 when VRECT reaches a pre-programmed voltage threshold, VTHRS1. In the illustrated example, VRECT reaches VTHRS1 at a time TOFF1. Microcontroller 27 detects that the monitored signal, VRECT, has reached VTHRS1 and in response, controls switch 36 to close. When switch 36 closes, the current flow stops flowing through lamp 10 but rather flows through closed switch 36. The electric arc within lamp 10 is stopped and fluorescent lamp 10 is turned off. Current, however, continues to flow through filaments 17 and 18 and the filaments continue to be heated. Switch 36 can only remain closed in this condition for a short amount of time or the switch will become overheated and will be destroyed. Next, switch 36 is opened as illustrated in FIG. 8. The cutting of current flow through ballast 16 causes a voltage to start to develop across ballast 16, but before the voltage can increase to the point that an arc is ignited through lamp 10, switch 36 is made to operate as a voltage clamp to limit the magnitude of the voltage spike. Clamp operation of switch 36 is illustrated in FIG. 9 by showing switch 36 in dashed lines. Due to the clamping action of switch 36, the voltage across ballast 16 is not high enough to ignite an arc through lamp 10, and energy stored in a magnetic field in ballast 16 is dissipated. After enough of the energy stored in ballast 16 has been dissipated and after filaments 17 and 18 have stopped ionizing gas to an adequate degree, then switch 36 is opened on a constant basis without igniting an arc. This condition is illustrated in FIG. 10. There is no current flow, and the filaments 17 and 18 begin to cool.

Figure 11:
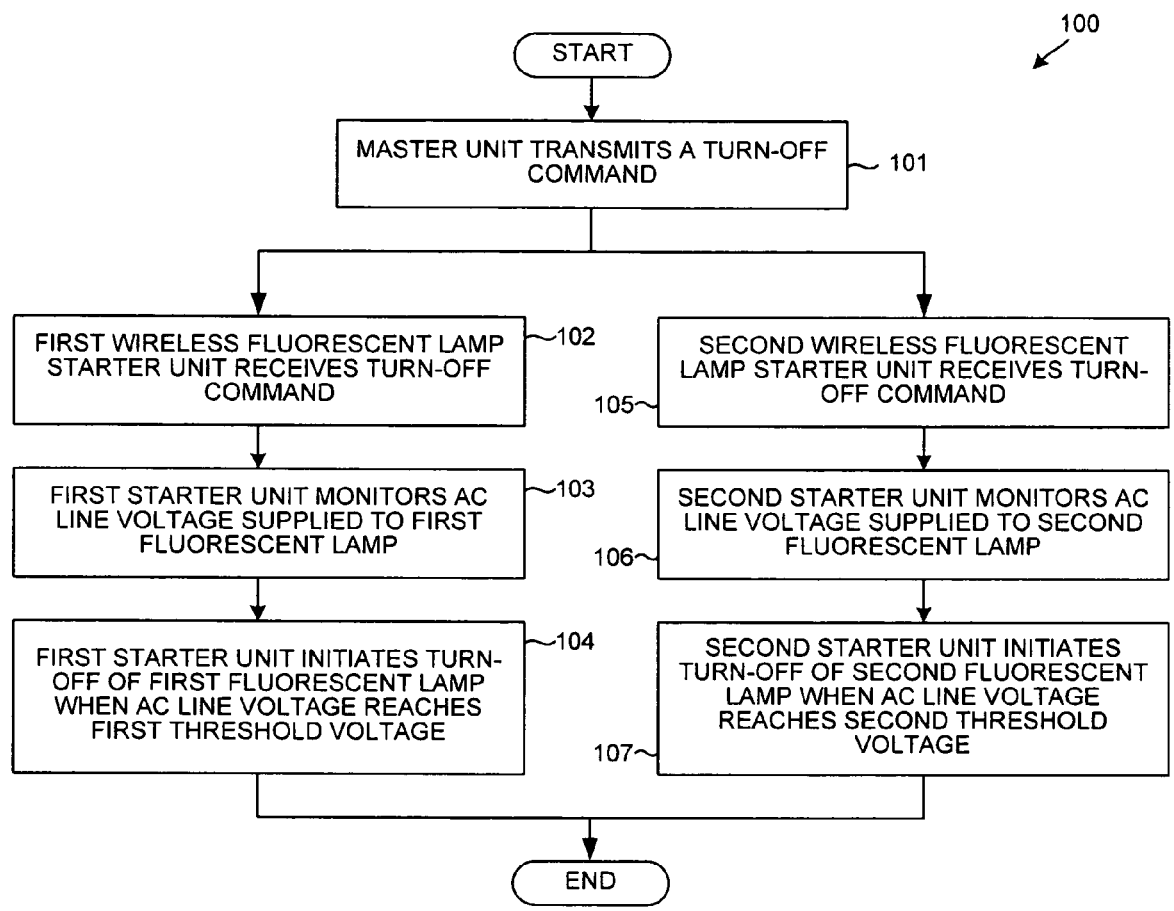
FIG. 11 is a flowchart that illustrates a method 100 of turning off multiple fluorescent lamps of a multi-lamp fluorescent light fixture simultaneously using wireless fluorescent lamp starter units.

FIG. 11 illustrates one example of a method 100 of initiating turn off of two fluorescent lamps, 10 and 11, at substantially the same time using two wireless fluorescent lamp starter units, 4 and 5. In one example, master unit 2 transmits a communication that includes a turn off command (step 101). Both, starter unit 4 and starter unit 5 receive this communication (steps 102 and 105, respectively). In one example, the communication is an RF communication from master unit 2 that is received by starter units 4 and 5. In another example, the communication is transmitted from master unit 2 to starter units 4 and 5 by way of wired conductors. In response to receiving the communication, starter unit 4, begins to monitor the voltage supplied across fluorescent lamp 10 (step 103). When starter unit 4 detects that the AC voltage supplied across lamp 10 reaches a first threshold voltage, VTHRS1, starter unit 4 initiates turn off of fluorescent lamp 10 (step 104). Analogously, in response to receiving the communication, starter unit 5 begins to monitor the voltage supplied across fluorescent lamp 11 (step 106). When starter unit 5 detects that the AC voltage supplied across lamp 11 reaches a second threshold voltage, VTHRS2, starter unit 5 initiates turn off of fluorescent lamp 11 (step 107). In one example, VTHRS1 and VTHRS2 are individually selected to have different values such that starter unit 4 initiates turn off of fluorescent lamp 10 within one millisecond of when starter unit 5 initiates turn off of fluorescent lamp 11. In another example, VTHRS1 and VTHRS2 are selected to have the same value such that starter unit 4 initiates turn off of fluorescent lamp 10 within one millisecond of when starter unit 5 initiates turn off of fluorescent lamp 11.

Although certain specific embodiments are described above for instructional purposes, the teachings of this patent document have general applicability and are not limited to the specific embodiments described above. The particular ways of turning off a first fluorescent lamp of a multi-lamp light fixture using a first starter unit and turning off a second fluorescent lamp of the same multi-lamp light fixture using a second starter unit at substantially the same time set forth in the description above are just illustrative examples. Other ways of registering a starter unit in the field are possible. For example, the master unit may generate and issue starter unit identifiers to starter units on a rolling basis, with the starter units and the master unit communicating on an ad hoc basis to associate individual starter units with individual starter unit identifiers. In some embodiments, the master unit may not detect occupancy, but rather detect ambient light. For example, the master unit may detect ambient light levels and selectively turn off fluorescent lamps to implement daylight harvesting in building environments where ambient light may be available to at least partially illuminate the space. In systems in which individual starter units are individually controllable, a master unit may turn on and/or turn off some fluorescent lamps of the system separately from other fluorescent lamps of the system. The RF transceivers of the starter units may form a wireless network usable to communicate other types of information. Master units need not be installed on ceilings and need not take the form illustrated in FIG. 1, but rather may take other forms and may be incorporated into other objects such as wall switches. The turning off of fluorescent lamps in a multi-lamp light fixture using wirelessly-controllable starter units is not limited to any particular type of fluorescent lamp technology and is not limited to preheat lamps having thermionic filaments and inductive ballasts. Although an example of the multi-lamp fixture 3 is described above involving a 230 volts AC power system, the master/starter unit system can work with other AC power sources such as 120 volts as well as with DC power sources. Accordingly, various modifications, adaptations, and combinations of various features of the described embodiments can be practiced without departing from the scope of the invention as set forth in the claims.

What is claimed is:

1. A method comprising:
   (a) initiating turn off of a first fluorescent lamp of a multi-lamp fluorescent light fixture using a first wireless fluorescent lamp starter unit; and
   (b) initiating turn off of a second fluorescent lamp of the multi-lamp fluorescent light fixture using a second wireless fluorescent lamp starter unit, wherein the initiating of (a) and the initiating of (b) occur at substantially the same time.

2. The method of claim 1, wherein the time between the initiating of (a) and the initiating of (b) is less than one millisecond.

3. The method of claim 1, wherein the first starter unit initiates turn off of the first fluorescent lamp when the first starter unit detects that a first Alternating Current (AC) voltage supplied to the first fluorescent lamp has reached a first voltage threshold.

4. The method of claim 1, wherein the second starter unit initiates turn off of the second fluorescent lamp when the second starter unit detects that a second Alternating Current (AC) voltage supplied to the second fluorescent lamp has reached a second voltage threshold.

5. The method of claim 1, further comprising:
   (c) receiving a turn off command from a master unit; and
   (d) monitoring a first AC voltage supplied to the first fluorescent lamp in response to receiving the turn off command.

6. The method of claim 5, further comprising:
   (e) monitoring a second AC voltage supplied to the second fluorescent lamp in response to receiving the turn off command.

7. The method of claim 5, wherein the receiving of (c) and the monitoring of (d) are performed by the first wireless fluorescent lamp starter unit.

8. The method of claim 6, wherein the receiving of (c) and the monitoring of (e) are performed by the second wireless fluorescent lamp starter unit.

9. The method of claim 5, wherein the turn off command received in (c) is received via a wireless communication from the master unit.

10. The method of claim 5, wherein the turn off command received in (c) is received via a wired connection to the master unit.

11. The method of claim 1, wherein the first wireless fluorescent lamp starter unit includes a Radio-Frequency (RF) receiver and does not include a glass tube, the wireless fluorescent lamp starter unit having a substantially cylindrical outer surface and a circular bottom surface, and wherein two terminals extend from the circular bottom surface.

12. An apparatus comprising:
    a first wireless fluorescent lamp starter unit;
    a first fluorescent lamp coupled to the first starter unit;
    a second wireless fluorescent lamp starter unit; and
    a second fluorescent lamp coupled to the second starter unit, wherein the first starter unit initiates turn off of the first fluorescent lamp at substantially the same time as the second starter unit initiates turn off of the second fluorescent lamp.

13. The apparatus of claim 12, wherein the first starter unit includes a first microcontroller that executes a first amount of firmware, wherein the second starter unit includes a second microcontroller that executes a second amount of firmware, wherein the first fluorescent lamp can be selectively turned off by control of the first microcontroller, and wherein the second fluorescent lamp can be selectively turned off by control of the second microcontroller.

14. The apparatus of claim 13, wherein the first microcontroller monitors a first Alternating Current (AC) voltage supplied to the first fluorescent lamp and initiates turn off of the first fluorescent lamp when the first AC voltage reaches a first voltage threshold.

15. The apparatus of claim 14, wherein the second microcontroller monitors a second Alternating Current (AC) voltage supplied to the second fluorescent lamp and initiates turn off of the second fluorescent lamp when the second AC voltage reaches a second voltage threshold.

16. The apparatus of claim 12, wherein the time between when the first starter unit initiates turn off of the first fluorescent lamp and when the second starter unit initiates turn off of the second fluorescent lamp is less than one millisecond.

17. The apparatus of claim 12, wherein the first starter unit includes a Radio-Frequency (RF) receiver that receives a wireless communication onto the first starter unit.

18. The apparatus of claim 17, wherein the wireless communication received by the receiver is a turn off command.

19. An apparatus comprising:
- a first fluorescent lamp coupled to a first ballast, wherein the first ballast is adapted to receive an Alternating Current (AC) line voltage from an AC line voltage supply;
- a second fluorescent lamp coupled to a second ballast, wherein the second ballast is adapted to receive the AC line voltage from the AC line voltage supply; and
- means for initiating turn off of the first fluorescent lamp and the second fluorescent lamp at substantially the same time without disconnecting the AC line voltage supply.

20. The apparatus of claim 19, wherein the means includes a first wireless fluorescent lamp starter unit and a second wireless fluorescent lamp starter unit.

* * * * *